A. SUNDH.
FLEXIBLE TUBING.
APPLICATION FILED JAN. 26, 1918.

1,300,512.

Patented Apr. 15, 1919.

UNITED STATES PATENT OFFICE.

AUGUST SUNDH, OF HASTINGS-UPON-HUDSON, NEW YORK, ASSIGNOR TO NATIONAL CLUTCH CO., INC., OF NEW YORK, N. Y., A CORPORATION OF NEW YORK.

FLEXIBLE TUBING.

1,300,512.  Specification of Letters Patent.  Patented Apr. 15, 1919.

Application filed January 26, 1918. Serial No. 213,974.

*To all whom it may concern:*

Be it known that I, AUGUST SUNDH, a citizen of the United States, resident of Hastings - upon - Hudson, in the county of Westchester and State of New York, have invented certain new and useful Improvements in Flexible Tubing, of which the following is a specification.

My invention relates to flexible metallic fluid-tight tubing, adapted for conveying fluids under pressure, and has particular reference to such tubing which is subjected to high internal and external pressures and to rough usage, such as fluid connectors between railroad cars, etc., and it is an object of this invention to provide a flexible metallic fluid-tight tubing for these and other purposes which will be commercially practicable.

In prior Patents, Nos. 1,179,575 and 1,179,576, issued to me April 18, 1916, I have shown flexible metallic tubing made up of a metal strip wound spirally to form a corrugated tube, and a wire spiral, the convolutions of which are laid in the corrugations of the tube.

It is an object of the present invention to provide a structure made up of a spirally wound corrugated strip to the corrugations of which the convolutions of a wire spiral, stiff enough to control the corrugated strip, are rigidly attached.

By this construction I obtain a flexible metallic fluid-tight tubing the corrugations of which will be at all times controlled by the wire spiral; and one in which the corrugations will be always proportionately flexed when the tubing is bent, and always properly spaced and maintained in their proper form.

The present construction is of high tensile strength, and the tubing as a whole is well able to withstand the rough usage to which it is subjected without being permanently distorted, and to stand up under high internal and external pressures without danger of rupture or collapse.

In general the invention comprises a wire spiral, of any suitable cross section, and hereinafter referred to as the holder. Between the convolutions of the holder I interpose the corrugations of a spirally wound corrugated strip. This strip is wound to form alternately inwardly and outwardly extending loops, the convolutions of the holder lying in the outwardly extending loops, and being rigidly secured thereto in any desired manner. It is to be understood of course, that it is within the scope of my invention to have the convolutions of the holder enter and be secured to the inwardly extending loops, if desired.

I have shown the adjacent edges of the spiral strip brought together and forced into a groove formed in the convolutions of the holder, and in practice the edges of the groove in the holder will be forced toward the edges of the strip, to make a fluid tight joint. However, it is to be understood that I am not limited to this particular type of joint, as obviously it is within the scope of my invention to make any type of joint desired. For instance the groove in the holder could be of any desired shape, or for that matter more than one groove could be formed. Also if desired the strip could be soldered or welded or rigidly secured to the holder in any other desired manner. It is to be understood also that the cross-section of the holder need not necessarily be circular, but the holder, however, should be of sufficient strength to control the spiral strip. If desired the tubing could be thickened at the points where the greatest stress is put upon it in operation, these thickened portions being evenly distributed throughout the tubing. I may also make the corrugated tubing of several thicknesses of metal strips, the edges of which will be secured rigidly to the convolutions of the holder. This structure would be flexible, but less liable to rupture from constant use than a tubing constructed of very thick metal, and the structure would successfully resist high external and internal pressures. As a still further variation, I may make the whole structure of a plurality of holders and a plurality of corrugated strips. Such a structure would possess great tensile strength, and would be exceedingly useful in mines for instance where it is often necessary to suspend a long length of cable from the overhead work.

By having the holder attached rigidly to the corrugations of the strip, the danger of the convolutions of the holder crawling out of the corrugations of the strip when the tubing is bent has been eliminated. It is apparent also, that the convolutions of the holder will always control the corrugations of the strip, and that therefore the latter will always be maintained properly spaced, and be proportionately flexed when the tubing is in use. It will be obvious also that I have provided a fluid tight flexible metallic tubing which will withstand the rough usage and high pressures it is subjected to without danger of rupture or collapse.

Figure 1:
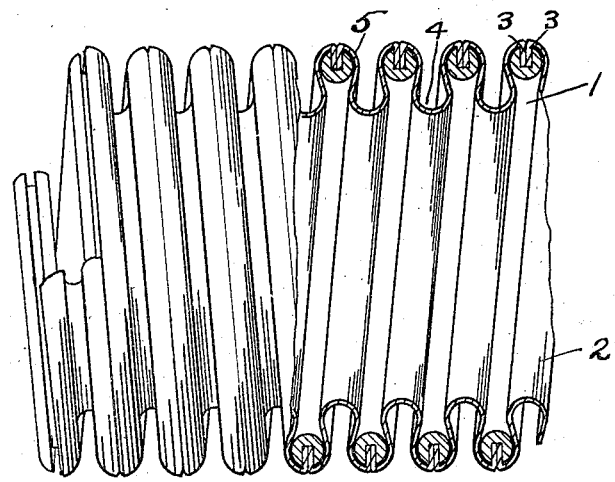
Figure 1 is a part sectional elevational view of one form of my invention.

Referring to the drawings in detail, and first of all to Fig. 1, 1 designates a wire spiral shown, for illustration only, circular in cross section, which I shall call the holder. A spirally wound metal strip 2 is provided, having its adjacent edges brought together, bent over as designated at 3, 3, and forced into a groove formed in the outer surface of each convolution of the holder 1. The strip 2 when wound forms inwardly extending loops 4 and outwardly extending loops 5, the convolutions of the holder 1 entering the latter, one convolution to each loop. In other words, the holder 1 and the corrugations of the strip 2 are rigidly connected to each other. The holder 1 is sufficiently stiff to always control the corrugations of the strip 2, and this construction will provide a strong and flexible tubing, fluid tight, and wherein the corrugations will always be maintained properly spaced apart; and wherein they will always be maintained in their proper form, and flexed proportionately throughout when the tubing is in use. It will be obvious also that this construction provides a tubing well able to withstand rough usage and high pressures, without permanent distortion and without danger of rupture or collapse.

Figure 2:
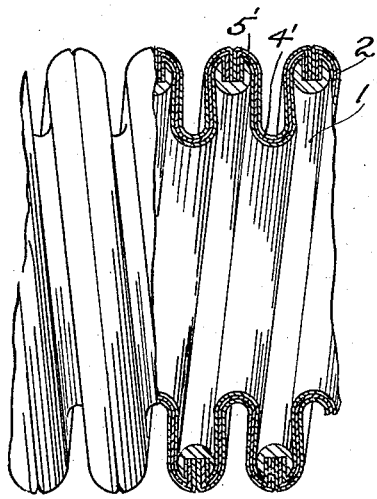
Fig. 2 is a part sectional elevational view of a modification thereof.

The structure illustrated in Fig. 2 comprises a holder 1' which is rigidly secured to the corrugations of a plurality of spirally wound metal strips 2', wound one upon the other and having their adjacent edges forced into a groove in the convolutions of the holder. By this construction I have provided loops 4' and 5' similar to the loops 4 and 5 of Fig. 1, but having triple walls. The purpose of this construction is to strengthen the corrugations or loops, and will be found useful where the tubing is used for conveying fluids under extremely high pressure. Another advantageous feature of this construction is that a series of layers of thin metal are used, which will allow the tubing to be bent many times without fracture, which would not be possible were the walls of the loops constructed of a metal as thick as the three strips taken together. The flexibility is increased also over what it would be with a solid wall. It is to be understood of course that three thicknesses of metal have been shown by way of illustration, and that the number may be varied as desired.

Figure 3:
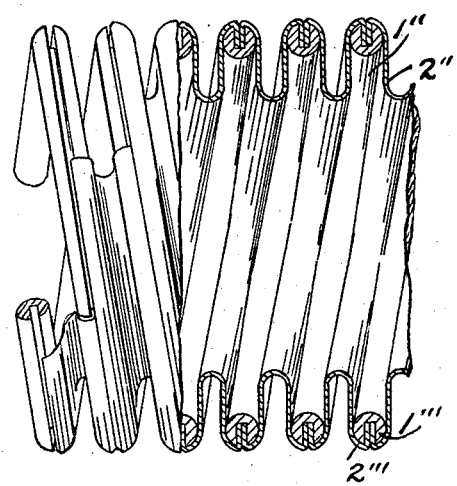
Fig. 3 is a part sectional elevational view of still another modification.

In Fig. 3, illustrating a still further modification of my invention, I have shown two holders 1'' and 1'''. The adjacent edges of a spirally wound corrugated metal strip 2'' are brought together and forced into a groove in the convolution of the holder 1''. The adjacent edges of a spirally wound corrugated metal strip 2''' are brought together and forced into a groove in the convolution of the other holder 1'''. This structure while still flexible, will be of great tensile strength, and as I have noted previously herein, will be very useful for use in mines, for instance, where long lengths of tubing are suspended from the overhead work.

From the foregoing it is apparent that I have arranged the various parts making up my tubing so that at all times the corrugations of the tubing will be controlled by the holder and will be proportionately flexed, and likewise that the corrugations will be always maintained properly spaced and in proper form; also that I have provided a flexible tubing which possesses high tensile strength and one which is well able to withstand high external and internal pressures, and to stand up under the rough usage to which it is subjected, without danger of rupture or collapse or permanent distortion.

I do not limit myself to the exact details of construction herein shown, for modifications within the scope of the invention will occur to those skilled in the art.

What I claim as new and desire to secure by Letters Patent of the United States is:—

1. In flexible metallic tubing, the combination of a spirally wound metal tape, and a resilient spirally wound wire to which said tape is rigidly secured to maintain the tubing fluid tight.

2. In flexible metallic tubing the combination of a spirally wound metal tape and a resilient spirally wound wire to which said tape is rigidly secured, the tubing as a whole being characterized by the tape being more flexible than the wire for the purposes set forth.

3. In flexible metallic tubing, the combination of a metal tape wound spirally to form a corrugated tube and a resilient spirally wound wire rigidly secured to the convolutions of said corrugated tube and having its periphery shaped to conform to the corrugations of said tube.

4. In flexible metallic tubing, the combination of a metal tape wound spirally to form a corrugated tube, and a spirally wound wire rigidly secured to the convolutions of said corrugated tube to maintain adjacent portions of the tape in position to form with said wire a fluid tight structure, the periphery of the convolutions of the wire being shaped to conform to the corrugations of the tube, the wire being characterized by being less flexible than the metal tape.

5. A flexible metallic tubing comprising a spirally wound corrugated strip and a spirally wound resilient member less flexible than the strip for binding and holding together the adjacent edges of said strip, and to cause the corrugations of the strip to be distorted uniformly and proportionately when the tubing is flexed.

6. A flexible tubing, comprising a spirally wound strip having abutting edges to form a hollow member, and a holder within said member to which the strip is rigidly secured.

7. A flexible tubing, comprising a spirally wound member, having a groove in the convolutions thereof, and a corrugated strip wound about said member and having its edges secured to the groove in the first named member.

8. A flexible tubing, comprising a hollow member and a holder rigidly secured to and within the hollow member, the holder being of sufficient strength to control the hollow member.

9. A flexible tubing, comprising a spirally wound member having a groove in the convolutions thereof, and a corrugated strip wound about said member and having its adjacent edges forced into the groove in the first named member.

AUGUST SUNDH.

Copies of this patent may be obtained for five cents each, by addressing the "Commissioner of Patents, Washington, D. C."